Dec. 28, 1965  D. H. CROSS ETAL  3,225,675
AUTOMATIC FILM PROCESSING APPARATUS
Filed Jan. 31, 1963  4 Sheets-Sheet 1
FIG_1
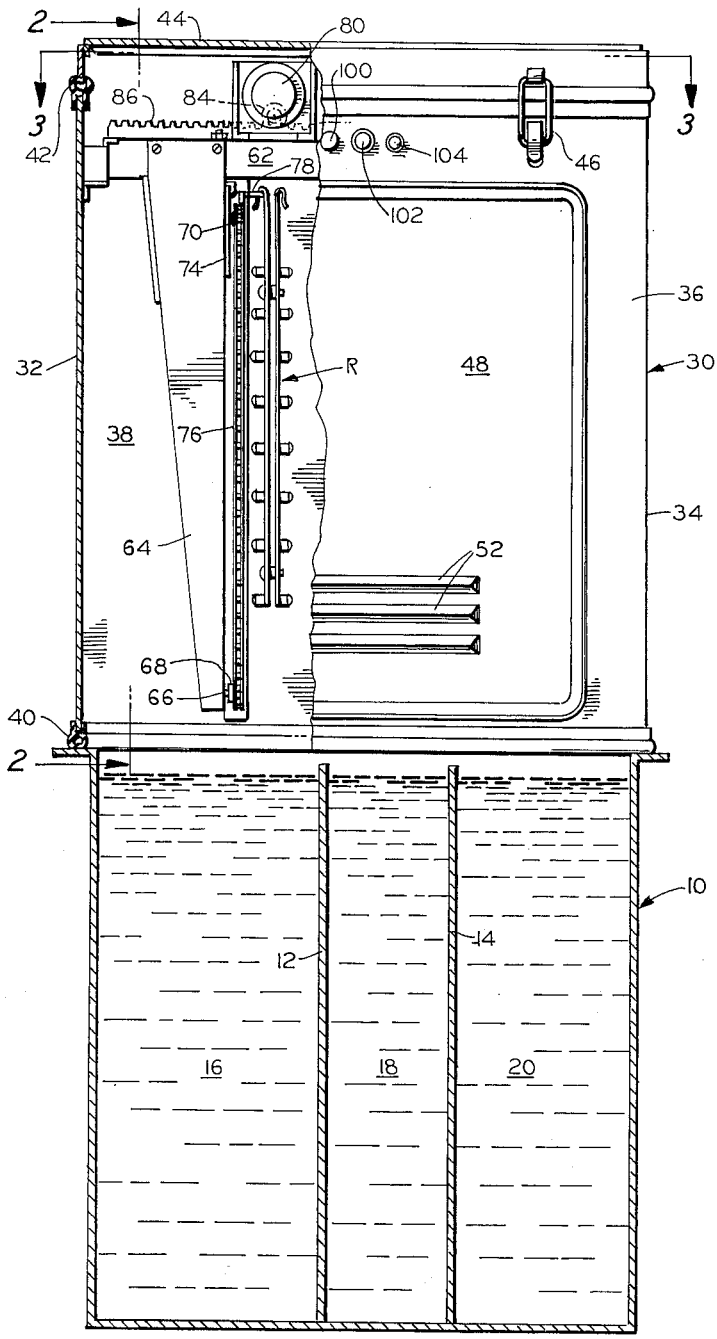
INVENTORS
DEE H. CROSS
FRANK J. LOHMAN
FRANK R. WARD
BY Paul B. Fike
PATENT AGENT

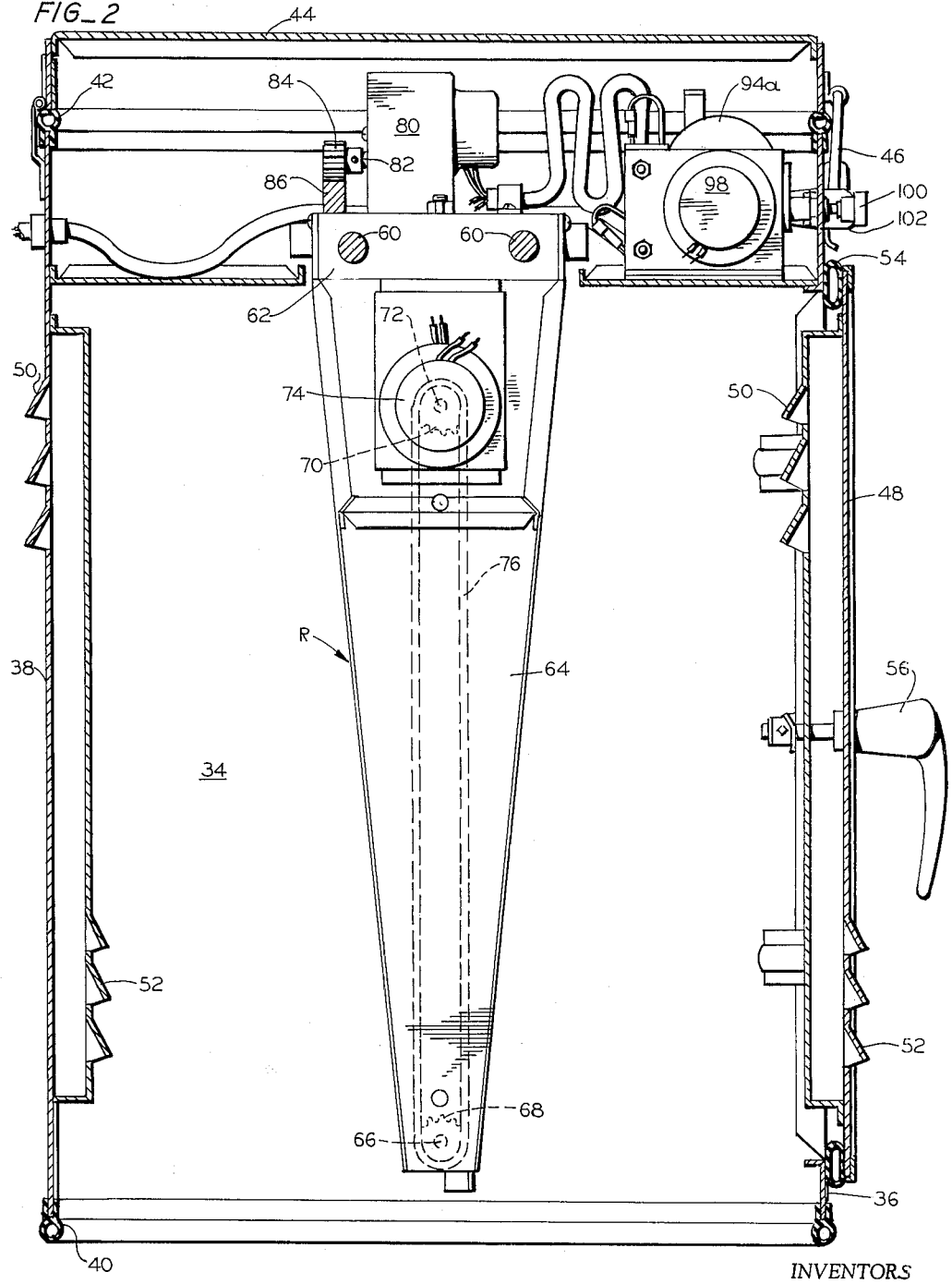

Dec. 28, 1965  D. H. CROSS ETAL  3,225,675
AUTOMATIC FILM PROCESSING APPARATUS
Filed Jan. 31, 1963  4 Sheets-Sheet 3
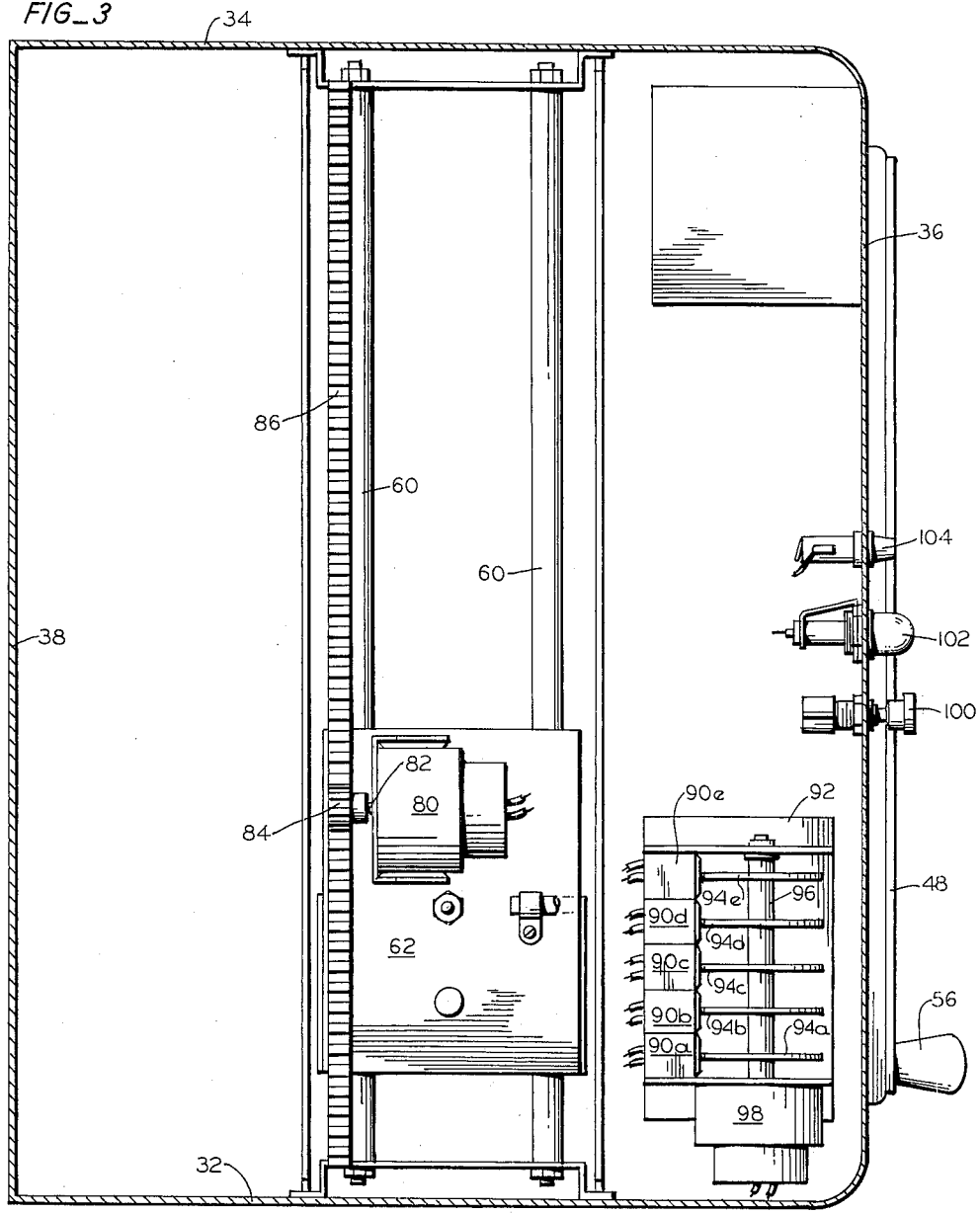
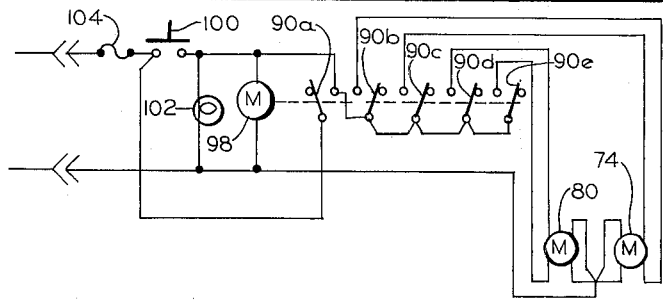
INVENTORS
DEE H. CROSS
FRANK J. LOHMAN
FRANK R. WARD
BY Paul B. Fihe
PATENT AGENT Dec. 28, 1965   D. H. CROSS ETAL   3,225,675
AUTOMATIC FILM PROCESSING APPARATUS
Filed Jan. 31, 1963   4 Sheets-Sheet 4
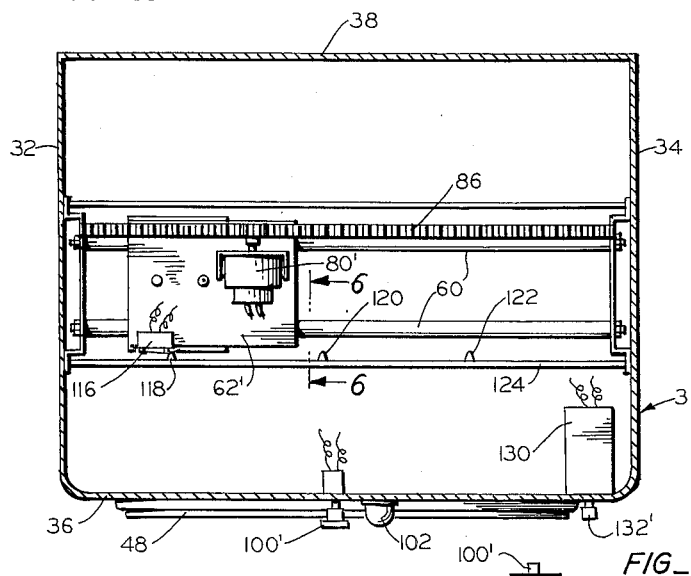
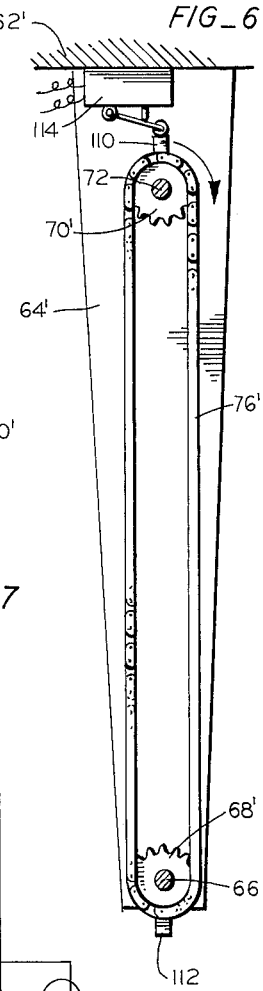
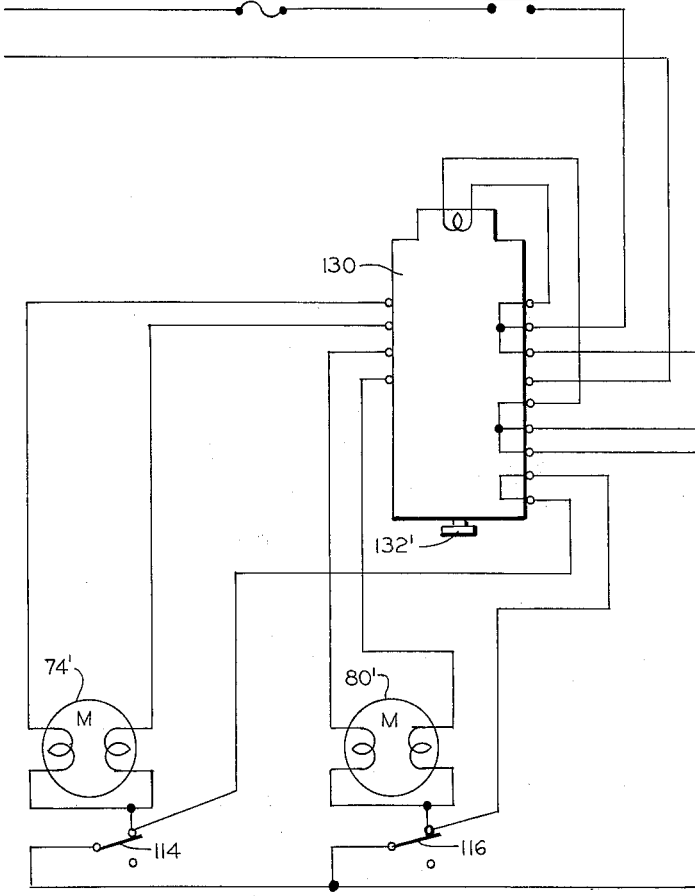
INVENTORS
DEE H. CROSS
FRANK J. LOHMAN
FRANK R. WARD
BY Paul B. Fike
PATENT AGENT

United States Patent Office 3,225,675
Patented Dec. 28, 1965

3,225,675
AUTOMATIC FILM PROCESSING APPARATUS
Dee H. Cross, 18891 Ansley Place, Saratoga, Calif., Frank J. Lohman, 940 Stonehurst Way, Campbell, Calif., and Frank R. Ward, San Jose, Calif.; said Ward assignor to said Cross and said Lohman
Filed Jan. 31, 1963, Ser. No. 255,300
2 Claims. (Cl. 95—89)

The present invention relates to processing of films and more particularly to a film processing apparatus arranged to immerse exposed film in the required developer, fix, and rinse solutions automatically in proper timed sequence.

There are a number of instances wherein the frequent and repeated processing of film is necessary, one notable example being in a dental office where many X-ray films must be processed. Whereas the commercial film processor obviously considers the processing of films as his primary duty, the processing of X-ray film by a dentist is but a secondary function subservient to his main responsibility to the particular patient seated in the dentist chair. By way of example, it is inconvenient and sometimes substantially impossible for a dentist or his assisting nurse to cease repair of a tooth and attend to the removal of X-ray film from a developing solution when such removal is necessary.

Accordingly, it is a general object of the present invention to provide a relatively simple, but automatic, film processing apparatus that can be employed by dentists or other persons to obviate the necessity for close supervision of the film processing.

More particularly, it is a feature of the invention to provide a film processing apparatus which automatically and in timed sequence immerses the film to be developed in the requisite developing, rinsing, and fixing solutions.

A further feature of the invention is the provision of a film processing apparatus whose operation can be instigated by the simple closing of a switch, the apparatus thereafter automatically completing the entire processing operation and finally de-energizing itself at the completion of the processing cycle.

It is a particular feature of the invention to provide a film processing apparatus including a simple mechanism from which a rack of X-ray film or the like can be suspended for vertical movement to enable immersion and subsequent withdrawal of the film from a particular solution.

Another feature of the invention is the provision of another mechanism which effects lateral or horizontal movement of the vertically-shiftable film suspension mechanism previously referred to.

Yet another feature of the invention is the provision of a cam-controlled electric circuit for automatically effecting sequential operation of the vertical and horizontal film moving mechanisms so that the film undergoes a complete processing cycle.

An additional feature is the provision of a manually-preset adjustment mechanism arranged cooperatively with an alternate circuit to enable a desired time of exposure of the film to the developing solution.

Yet another feature of the invention is the provision of a light-impervious housing for the film processing mechanism which however permits the flow of air therethrough to expedite drying of the processed film.

Yet a further feature of the invention is the provision of a film processing apparatus that is adapted for simple and rapid installation over an existent film processing tank.

These as well as other objects and features of the invention will become more apparent from a perusal of the following description of the apparatus illustrated in the accompanying drawings wherein:

FIG. 1 is a front elevational view of a film processing apparatus embodying the present invention, portions of the structure being broken away and illustrated in section to clarify details of interior construction, FIG. 2 is an enlarged vertical sectional view taken substantially along line 2—2 of FIG. 1, FIG. 3 is a horizontal sectional view taken substantially along line 3—3 of FIG. 1, FIG. 4 is a schematic circuit diagram of the electrical control circuit of the apparatus shown in FIGS. 1, 2, and 3, FIG. 5 is a horizontal sectional view similar to FIG. 3 but illustrating another embodiment of the invention which incorporates a variable control for the developing time of the film, FIG. 6 is a vertical fragmentary sectional view taken along line 6—6 of FIG. 5, and FIG. 7 is a schematic circuit diagram of the modified apparatus shown in FIGS. 5 and 6.

With initial reference to FIG. 1, the film processing apparatus is arranged to support a rack R of X-ray or the like for movement in timed sequence through a film processing cycle which, as is well known, requires initial immersion in a developing solution, thereafter in a rinse solution, thence in a fix solution, and finally in the rinse solution again.

As shown in FIG. 1, a processing tank 10 is divided by partitions 12, 14 to form three compartments 16, 18, 20; the compartment 16 on the left containing the developing solution, the central compartment 18 containing the rinse solution, and the compartment 20 on the right containing the fix solution. This tank 10 can be an integral part of the film processing apparatus or, as illustrated, can constitute an existent film processing tank on which the film moving or transporting apparatus, as a separate unit, can be mounted. In the latter event, the exterior housing of the film transporting unit is in the form of a rectangular hood 30 including spaced, parallel side walls 32, 34 and similarly spaced front and rear walls 36, 38 having a continuous resilient gasket 40 extending along their lowermost edges where the hood rests on the uppermost edge of the processing tank 10 itself to thus form a light-impervious seal.

A similar resilient gasket 42 extends around the upper edges of the side, rear and front walls 32, 34, 36 and 38 to removably support a cover 44 in similar light-impervious relationship, the cover being held in this position by releasable fasteners 46 of a conventional variety. The described cover 44, the front wall 36, and both side walls 32, 34 are composed of planar solid sheet metal or plastic, but the rear wall 38 and a door 48 hinged over an opening in the front wall 36 for movement between opened and closed dispositions are each formed by double spaced layers of sheet material arranged to permit the entry of air into the hood, but to preclude light passage therethrough. For this purpose, louvers 50 are formed adjacent the upper end of one sheet layer and similar louvers 52 are formed at the lower end of the other layer. The door 48 is additionally provided with a resilient sealing gasket 54 adjacent its periphery so that when moved to its fully closed position, as shown in FIG. 2, and there secured by appropriate rotation of a handle 56, a light-impervious seal is formed between the door periphery and the adjoining edge of the front wall opening.

The mechanism within the hood 30 which provides for both horizontal and vertical motion of the suspended film rack R includes a pair of spaced parallel rods 60 extending between the side walls 32, 34 of the hood to slidably support a carriage 62 for horizontal movement to the left or right, as viewed in FIG. 1. From this carriage 62 disposed within the uppermost portion of the hood 30, an elongated bracket 64 is secured to extend substantially vertically downwardly therefrom. Adjacent its lower end, the bracket 64 rotatably supports a substantially horizontal stub shaft 66 to which is keyed a small idler sprocket 68. A similar sprocket 70 is secured on a horizontal drive shaft 72 projecting from a small motor 74 mounted on the bracket 64 immediately under the carriage 62 so that the sprockets 68, 70 are in planar alignment. The sprockets 68, 70 mount an endless sprocket chain 76, most clearly illustrated in FIGS. 1 and 2, one link of which carries a projecting hanger 78 to receive the upper end of the film rack R, as clearly shown in FIG. 1, so that the film rack is suspended in a substantially vertical disposition in close parallelism to the plane defined by the sprockets 68, 70 and the sprocket chain 76 carried thereby. Obviously, when the drive motor 74 is energized to effect movement of the chain 76 on the sprockets 68, 70, the rack R will be moved upwardly or downwardly dependent upon the direction of the chain movement. The length of the sprocket chain 76 is sufficient so that when the hanger 78 is adjacent the uppermost sprocket 70, as shown in FIG. 1, the entire rack will be within the hood 30 and withdrawn from the solution thereunder. On the other hand, when the hanger 78 is positioned adjacent the lowermost sprocket 68, all of the film on the rack R will be immersed within the solution thereunder.

In order to effect horizontal motion of the described rack suspending mechanism, the horizontally slidable carriage 62 from which it is suspended mounts a second motor 80 on its upper surface so that the outer end of the motor shaft 82 carries a small pinion 84 arranged to engage a rack 86 fixed between the side walls 32, 34 of the hood 30 in parallelism to the carriage supporting rods 60. Obviously, energization of the motor 80 in one direction effects movement of the carriage 62 and the suspended rack R to the right, while energization of the motor in the other direction effects movement to the left, as viewed in FIG. 1.

To control energization of the two described motors 74, 80 at the proper times, five push button switches 90a, 90b, 90c, 90d and 90e are mounted on a bracket 92 in the upper front of the unit, as best shown in FIG. 3, for actuation by five cams 94a, 94b, 94c, 94d, 94e, all of which are secured on the drive shaft 96 of a control motor 98. The cams 94a, 94b, 94C, 94d, 94e are formed to energize the two motors 74, 80 in the proper timed sequence through actuation of the mentioned switches 90a, 90b, 90c, 90d, 90e electrically connected in a control circuit, schematically shown in FIG. 4.

In order to instigate operation of a film processing cycle, a main switch 100 in the form of a push button is mounted at the upper front of the cabinet adjacent a signal light 102 and a fuse 104 for the apparatus, depression of the push button instigating a complete cycle of film processing whose termination will be indicated when the signal light goes out. The cycle of operation will be explained by reference to the circuit diagram shown in FIG. 4 wherein the illustrated disposition of the switches 90a, 90b, 90c, 90d, 90e is that prior to initiation of the cycle.

When the push button switch 100 is depressed, initial direct energization of the signal light 102 and the control motor 98 is provided and immediately thereafter, rotation of the first cam 94a on the control motor shaft 96 moves the first switch 90a to the right from the position illustrated to establish a holding circuit through this switch and the control motor 98 which circuit is maintained through the remainder of the processing cycle. The motion of the switch 90a also energizes one terminal of each of the remaining control switches 90b, 90c, 90d and 90e preparatory to energization of the horizontal and vertical drive motors 74, 80 which are suitably connected thereto as illustrated.

Immediately after the first switch 90a has moved to establish the holding circuit through the control motor 98, the second switch 90b on the control motor shaft 96 is moved from its illustrated position to the left to establish a complete circuit through the vertical motor 74 which effects movement of the rack R from the position illustrated in FIG. 1 downwardly into the developing solution. When the rack R reaches its lowermost position, the second switch 90b is returned to its initial position to deenergize the vertical motor 74, thus leaving the rack R and the film thereon immersed within the developing solution.

After a predetermined time dependent on the selected configuration of the third cam 94c, the third control switch 90c is moved from the illustrated position to the left which energizes the vertical motor 74 in the opposite direction from that of its original energization by the second switch 90b so as to effect withdrawal of the film rack R from the developing solution. When the film rack R has been fully withdrawn to the position illustrated in FIG. 1, the third switch 90c returns to its initial position as illustrated, and at this time, the fourth switch 90d is moved to the left from the illustrated position to effect energization of the horizontal motor 80 and movement of the entire carriage 62 and the rack R suspended therefrom to the right, as shown in FIG. 1. When the rack R arrives at a horizontal disposition over the rinse solution, the fourth switch 90d opens under control of its actuating cam 94d and the second switch 90b substantially simultaneously closes to instigate downward movement of the rack R into the rinse solution.

When the film is fully immersed in the rinse solution, the second switch 90b opens to deenergize the vertical motor 74 and after a predetermined time dependent upon the cam configurations, the third switch 90c is again moved from its illustrated position to the left to effect vertical movement of the rack R upwards for withdrawal from the rinse solution. When the rack R has been fully withdrawn from the rinse solution, the third switch 90c moves back to its original disposition, as illustrated, and the fourth switch 90d again under the control of its cam 94d is moved from its illustrated position to the left to again initiate horizontal motion of the rack R and its suspending mechanism.

Once again, when the rack R and its suspending mechanism has moved horizontally to a position over the fix solution, the fourth switch 90d is moved to its original open position, as illustrated, to deenergize the horizontal motor 80 and substantially simultaneously the second switch 90b is moved from its illustrated position to the left to once again energize the vertical motor 74 to lower the rack R into the fix solution. The vertical motor 74 is deenergized by return of the second switch 90b to its original disposition, when the rack R is fully immersed in the fix solution and after a predetermined period of time the third switch 90c is once again moved from its illustrated position to the left to effect withdrawal of the rack R from the fix solution.

After the rack has been fully withdrawn from the fix solution, the third switch 90c moves to its original open position to stop further vertical motion of the rack and the fifth switch 90e is now energized for the first time to move from its illustrated open disposition to the closed disposition so as to energize the horizontal motor 80 with a reverse polarity and effect motion of the carriage 62 and the mechanism suspended therefrom to the left, as viewed in FIG. 1. When a position over the central rinse solution has been reached, the fifth switch 90e is again opened by its cam, and the second switch 90b is substantially simultaneously moved to instigate downward motion of the rack into the rinse solution. When full immersion of the film in the rinse solution is obtained, the second switch 90b again opens and after a predetermined period of time the third switch 90c closes to instigate upward movement of the rack R from the rinse solution.

When the rack is fully withdrawn from the rinse solution, the third switch 90c opens and the fifth switch 90e closes to instigate further motion of the rack R and the mechanism suspended from the carriage 62 to the left until the initial position of the mechanism, as illustrated in FIG. 1, is once again attained at which time the fifth switch opens and further movement of the carriage 62 and the mechanism suspended therefrom ceases.

When the fifth switch 90e opens to deenergize the horizontal motor 80, substantially simultaneously the first switch 90a returns to its original open disposition to thus open the holding circuit for the control motor 98 and the signal light 102 to indicate that the film processing cycle is complete.

After the completion of the film processing cycle, the door 48 may be opened and the film may be removed, or the film may remain within the unit and, because of the louvers 50, 52 in the front and rear walls of the unit, will dry within a relatively short period of time.

It will be obvious that certain modifications and/or alterations can be made in the described structure illustrated in FIGS. 1, 2, 3, and 4 without departing from the spirit of the invention. One slightly modified embodiment of the invention is disclosed in FIGS. 5, 6, and 7 wherein the most significant feature of departure from the first embodiment is the incorporation of means for varying the time that the film is exposed to the developing solution. Since substantial similarities exist in this second embodiment relative to the first described embodiment of the invention, corresponding elements will be indicated by like reference numerals with an added prime notation.

More particularly, as in the first embodiment of the invention, the film rack is suspended from an endless link chain 76' trained about two vertically spaced sprockets 68', 70' supported from a bracket 64' that is in turn carried by a horizontally movable carriage 62'. Two dogs 110, 112 are carried at opposite positions on the link chain 76' (see FIG. 6) and are alternately arranged to engage a normally-closed micro-switch 114 supported from the bracket 64' adjacent the uppermost sprocket 70' to effect energization of a control circuit to be described hereinafter.

As shown best in FIG. 5, the mentioned horizontally movable carriage 62' also supports a second normally-closed micro-switch 116 arranged to engage one or another of three dogs 118, 120, 122 adjustably positioned for shiftable motion along a rod 124 supported between the side walls of the hood 30'. The three dogs 118, 120, 122 are adjusted to positions over the three solution tanks, respectively, and are fixed in such positions by suitable set screws (not shown).

The two described micro-switches 114, 116 are connected in a circuit schematically illustrated in FIG. 7 which includes the vertical and horizontal motors 74', 80' and a timer mechanism 130 which is similar to that used in a conventional automatic washing machine so that details thereof will not be described in that they form no part of the present invention. This timer unit 130 is mounted in the upper right front of the hood 30' and a control knob 132' projects from the timer unit through the front wall of the hood to enable a presetting of the desired time that the film remains in the developing solution. It will be apparent that the described timing mechanism 130 replaces the cam-controlled timer illustrated and described in connection with the first embodiment of the invention.

In operation, the mechanism goes through the same cyclical sequence as that described in connection with the first embodiment of the invention, the primary difference being that the film remains in the developer solution for a time dependent upon the setting of the timer control knob 132'. More particularly, however, after operation of the apparatus has been instigated by depression of the push button 100', a holding circuit is established in the timer unit for the entire cycle and the vertical motor 74' is almost immediately thereafter energized to initiate descent of the film into the first solution. When the rack completes its descent, the one dog 110 on the link chain 76' engages the micro-switch 114 to open the circuit to the vertical motor and effect cessation of further motion. At the completion of the developing time, a parallel circuit is temporarily energized within the timer mechanism 130 to re-energize the vertical motor 74' with opposite polarity so that the film is withdrawn from the developer solution. Such parallel circuit opens shortly thereafter but since the dog 110 is out of contact with the micro-switch 114, the vertical motor circuit remains closed until it is subsequently denergized when the other dog 112 on the link chain 76' engages the micro-switch 114 and thus opens the motor energizing circuit. In a generally similar fashion, engagement of the micro-switch 116 on the carriage 62' by one of the dogs 118, 120, 122 on the horizontal rod 124 effects cessation of energization of the horizontal motor 80' until a similar parallel circuit is temporarily established through the timer mechanism 130 to energize the motor 80 with appropriate polarity to move the carriage 62' to the left or right in a fashion similar to that described in conjunction with the first embodiment of the invention.

Yet further modifications and alterations can obviously be made without departing from the spirit of the invention, and foregoing description of two embodiments is to be considered as purely exemplary and not in a limiting sense; and the actual scope of the invention is to be indicated only by reference to the appended claims.

What is claimed is:

1. In a film processing apparatus including three tanks of processing liquids, a carriage mounted for horizontal sliding movement, a bracket mounted on said carriage to project downwardly therefrom, means supporting an endless sprocket chain for movement on said bracket so that at least one flight of said chain extends substantially vertically, means for suspending film from one link of said chain, motor means for moving said carriage horizontally, separate motor means for moving said sprocket chain, and means sequentially energizing said carriage-moving motor means and said chain-moving motor means so that film suspended from said chain is immersed successively in the first, second, and third tank, then back to the second of the tanks, and finally returned to its initial position over the first tank, said energizing means including an electric circuit having automatically-controlled multiple switch means for said motor means, said multiple switch means including a first switch means energizing said carriage-moving motor means in one direction, a second switch means energizing said carriage-moving motor means in the opposite direction, a third switch means energizing said chain-moving motor means in one direction, and a fourth switch means energizing said chain-moving motor means in the opposite direction.

2. A film processing apparatus which comprises three adjacent tanks containing developer, rinse, and fix solutions, a light-impervious hood seated in light-impervious relation over said tanks, and means for immersing film successively in said developer, rinse, fix and rinse tanks in that order, said film-immersing means including a carriage mounted in said hood for substantially horizontal sliding movement, a reversible drive motor on said carriage for effecting horizontal motion of said carriage, a bracket suspended from said carriage to project downwardly therefrom to a position immediately above the solutions in said tanks, means mounted on said bracket for vertical motion upwardly and downwardly and adapted to carry film to be processed, a motor for said film-carrying means, and means sequentially energizing said carriage motor and said film-carrying motor sequentially so that film is immersed successively in said developer tank, said rinse tank, said fix tank, then back to said rinse tank and finally to an initial position over said developer tank, said energizing means including an electric circuit having automatically-controlled multiple switch means for said motors, said multiple switch means including a first switch means energizing said carriage motor in one direction, a second switch means energizing said carriage motor in the opposite direction, a third switch means energizing said film-carrying means downwardly, and a fourth switch means energizing said film-carrying means upwardly.

References Cited by the Examiner

UNITED STATES PATENTS

| | | | |
|---|---|---|---|
| 2,194,345 | 3/1940 | Winans | 95—89 |
| 2,386,781 | 10/1945 | Daly | 95—89 X |
| 2,440,314 | 4/1948 | Turner | 95—89 |
| 2,542,830 | 2/1951 | Newton et al. | 95—89 |
| 3,088,610 | 5/1963 | Pianowski | 134—77 X |

FOREIGN PATENTS 720,277  12/1954  Great Britain.

NORTON ANSHER, *Primary Examiner.*